United States Patent [19]

Klein

[11] Patent Number: 4,657,310

[45] Date of Patent: Apr. 14, 1987

[54] BRAKE SYSTEM FOR AUTOMOTIVE VEHICLES WITH CONTROLLABLE BRAKE FORCE DISTRIBUTION

[75] Inventor: Hans C. Klein, Hattersheim, Fed. Rep. of Germany

[73] Assignee: Alfred Teves GmbH, Frankfurt am Main, Fed. Rep. of Germany

[21] Appl. No.: 716,332

[22] Filed: Mar. 26, 1985

[30] Foreign Application Priority Data

Mar. 30, 1984 [DE] Fed. Rep. of Germany ....... 3411743

[51] Int. Cl.$^4$ ................................................ B60T 8/02
[52] U.S. Cl. ...................................... 303/6 C; 303/61; 303/100; 303/119; 303/DIG. 4; 303/22 R
[58] Field of Search ..................... 303/100, 22 R, 6 C, 303/22 A, 6 R, 91, 6 A, 102, 105, 110, 111, 113–119, 61–63, 68–69, 23, DIG. 1, DIG. 2, DIG. 3, DIG. 4; 188/181, 195, 349, 354, 16

[56] References Cited

U.S. PATENT DOCUMENTS 4,289,358 9/1981 Dufft et al. ..................... 303/22 R
4,418,966 12/1983 Hattwig ............................. 303/100

FOREIGN PATENT DOCUMENTS 0062246 10/1982 European Pat. Off. .

Primary Examiner—Douglas C. Butler
Attorney, Agent, or Firm—James B. Raden; William J. Michals

[57] ABSTRACT

A brake system provided for automotive vehicles comprises a braking pressure generator (3) and a braking pressure modulator (4) which is arranged in the pressure medium conduit leading to the rear wheel brakes (16, 17) and which allows to vary the apportioning of the braking pressure to the wheel brakes of the front and the rear axle to achieve approximation to an ideal brake force distribution in dependence on the instantaneous axle load. The braking pressure modulator (4) contains valve assemblies (5) serving to supply braking pressure alternately to the wheel brakes (16, 17) of the right and the left rear wheel in such a manner that one of the two rear wheels (HR or HL) furnishes the predominant portion of the brakeforce allotted to the rear axle. The pressure delivery alternates to connect to the other rear wheel on each braking operation or on each brake actuation or according to predetermined time criteria.

10 Claims, 1 Drawing Figure

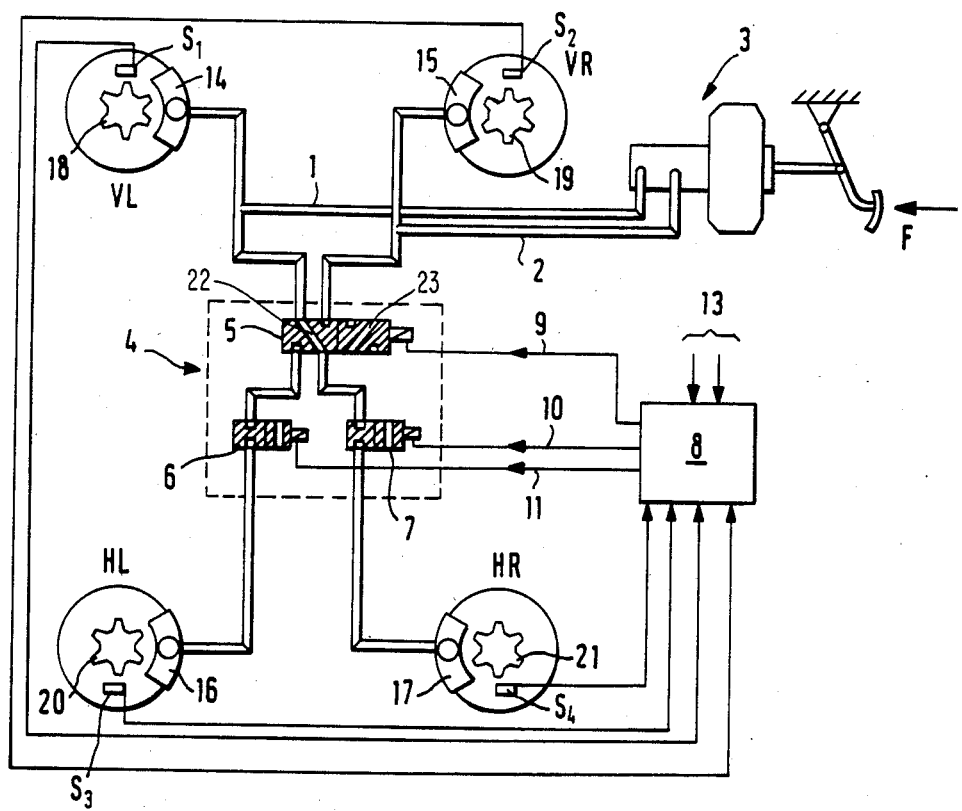

BRAKE SYSTEM FOR AUTOMOTIVE VEHICLES WITH CONTROLLABLE BRAKE FORCE DISTRIBUTION

BACKGROUND OF THE INVENTION

The present invention relates to a brake system for automotive vehicles comprising a braking pressure generator and a controllable braking pressure modulator which is arranged in the pressure medium conduits leading to the rear-wheel brakes. The system allows variation of the apportioning of the braking pressure onto the wheel brakes of the front axle and the rear axle for the purpose of approximation to an ideal brake force distribution dependent upon the instantaneous axle load.

It is known that the dimensioning of brake systems is rendered difficult by the changes in static and dynamic axle loads and by axle load shifts. Therefore, by invariably adjusting the braking pressure distribution onto the front axle and the rear axle, optimum conditions may be accomplished at most in a specific state of loading and driving.

Moreover, for decreasing the imminent danger of skidding, the share in braking pressure allotted to the rear-wheel brakes is desired to be as small as to allow the rear wheels to lock in all situations only after the front wheels do, although the rear wheels are relieved from load owing to the dynamic axle load shift when braking at higher speed and, in consequence thereof, tend to lock sooner than the front wheels. For this reason, a considerably larger portion of braking pressure must be allotted to the front axle when brake force distribution is invariable.

A certain improvement or, respectively, approximation to the ideal brake force distribution permits to be obtained by the known brake force distributors which vary the brake force distribution onto the front and the rear axle according to various function principles in response to braking pressure, load or deceleration. The extent of adaptation to the ideal distribution attainable differs widely. In general, even when sophisticated devices and great adjusting efforts are involved, satisfactory adaptation to the ideal characteristic curve can be obtained at most in either one of the two borderline cases "unloaded/loaded".

A brake force distributor is known in the prior art wherein the static axle load distribution is measured by sensors when the vehicle is at standstill. The results thereof are delivered to a microcomputer which governs the brake force distribution, in consideration of the test values, according to a memorized mathematical relation and while additionally considering the pressure measured in the front-axle circuit and in the rear axle circuit (European publication EP-AL No. 062246). Despite the high effort entailed, in this device the adaptation is also far from being ideal in the majority of driving situations, because only a theoretical adherence value, but not the actual value of adherence between road and tires can be made the basis for dimensioning the brakes, and for reasons of safety and for prevention of overbraking of the rear wheels, the device must be dimensioned such that the front axle supplies the greater contribution to braking.

It has been proposed to have electromagnetically controlled modulators control the brake slip at the rear wheels in dependence on the brake slip at the front wheels such that a value of adherence will result at the rear axle which is always equal to, or somewhat less than, that at the front wheels (German publication No. P 33 01 948).

It is an object of the present invention to overcome the disadvantgages described and to create a brake system which permits to attain a better approximation to the ideal brake force distribution or, respectively, brake force apportioning, onto the front and the rear axle without impairing the directional stability of the vehicle and, respectively, without increasing the imminent danger of skidding (due to locking rear wheels).

SUMMARY OF THE INVENTION

This object is achieved in a surprisingly simple manner by improving upon a brake system of the type initially referred to such that the braking pressure modulator contains valve assemblies which allow to supply braking pressure alternately to the wheel brakes of the right and of the left rear wheel such that, alternately, one of the two rear wheels furnishes the predominant share or all of the brake force apportioned to the rear axle, that means that portion of brake force that is allotted to the rear axle in the event of roughly ideal brake force distribution.

The present invention is based on the fact that a short stopping distance can only be obtained by an optimally high utilization of the coefficient of friction between tires and road and that it must be prevented that the two rear wheels lock in advance of the two front wheels, in order to obtain sufficient lateral guiding force at the rear axle and to thereby ensure directional stability during braking. While all presently known and used brake systems and brake force distributors are designed such that, in the normal case as long as the system is intact, at least roughly the same braking pressure is acting in each case at both wheels of an axle, the present invention makes use of the consideration that the driving stability of the vehicle will still be safeguarded, even in the event of one rear wheel locking, if the second rear wheel continues to roll in an unbraked or slightly braked fashion.

In connection with the failure of one brake circuit in systems with diagonal or right/left allotment of brake circuits, it has been proved mathematically and tested practically that driving stability of the vehicle will be maintained even in this exceptional situation when a rear wheel locks.

Depending on the respective embodiment of this invention, a changing-over of the pressure delivery to the other rear wheel is performed with every braking action or every brake actuation. It is likewise possible, on the other hand, to perform this change-over only after a predetermined number of braking actions, according to a time criterium or after having covered a specific driving distance, the change-over being preferably effected when the brake is released. For safeguarding even wear, this alternation from the one to the other rear-wheel brake could also be made dependent on the brake pad thickness remaining.

In one embodiment of this invention, only one nof the two rear-wheel brakes, respectively, will be supplied with pressure during each braking action. On the other hand, it is of advantage in further embodiments if, until attainment of a predetermined limit value of braking, of the braking pressure or of a derived braking value, both rear-wheel brakes can be acted upon by the same braking pressure, and if in excess of this limit value the braking pressure remains constant in one of the two rear-wheel brakes, alternately, or rises but slightly in comparison to the other rear-wheel brake. Said limit value can be varying in dependence upon the deceleration of the vehicle, of the axle loads and/or in response to measured variables derived.

The braking pressure modulator of the inventive braked system is substantially composed of one or more controllable devices, for example, electromagnetically or hydraulically actuatable multi-directional valves. A four-way/two-position directional control valve is particularly apt as a valve assembly for the alternating pressure delivery into the right and the left rear-wheel brake, the said valve opening in both of its switch positions each one pressure medium conduit from the braking pressure generator to one of the two wheel brakes of the rear axle, while it closes the pressure medium conduit to the other rear-wheel brake or throttles its flow.

Instead of the above, if a four-way/three-position directional control valve is used, there will be available a third switch position in which the passage to both rear-wheel brakes is suitably closed. By dosedly connecting or, respectively, opening the flow passage, a like valve enables to develop the braking pressure in a measured quantity or, respectively, to sensitively control the braking pressure variation, for instance in response to the braking pressure or the brake slip at the front axle.

The brake system of the present invention is realized by minimal manufacturing effort, while nonetheless attaining considerable improvement of the brake force distribution. Moreover, the rear wheel is braked minimally or considerably less and therefore is rolling almost without slip which permits in addition a direct measurement of the actual vehicle speed and deceleration, whereby the formation of a vehicle reference value for the control of brake force distribution is considerably simplified.

BRIEF DESCRIPTION OF THE DRAWING

Further features, advantages and applications of this invention can be gathered from the following description of an embodiment of this invention with reference to the accompanying drawing in which the single FIGURE illustrates a brake system in accordance with the present invention.

DETAILED DESCRIPTION

In this schematically illustrated brake system, the front and the rear wheels communicate by way of two diagonal pressure medium circuits 1 and 2 with a braking pressure generator 3, which may consist e.g. of a tandem master cylinder in conjunction with a vacuum booster. The force applied via a pedal on the braking pressure generator 3 is symbolized by the arrow F. The two front wheels VL, VR communicate directly with the braking pressure generator 3, while the rear wheels HL, HR are connected thereto via a braking pressure modulator 4.

In this example, the braking pressure modulator 4 is composed of three multi-directional control valves 5, 6, 7. Said valves, shown in their inactive position, are electromagnetically actuatable and are controlled by an electronics 8 via the signal lines 9, 10, 11. The signal in each of lines 9, 10, and 11 is produced in a known fashion when the input of the electronics 8 is in turn supplied with measured signals which are generated by means of the sensors $S_1$ to $S_4$ and which transmit data about the rotational behavior of the individual vehicle wheels. Herein, inductive pick-ups for measuring data are concerned in which, with the aid of toothed disc 18 to 21 co-rotating with the wheels, voltages are induced whose frequencies are proportional to the rotating movement of the wheels. Besides, said electronics comprises further inputs 13 to which there can be connected e.g. sensors for the hydraulic pressure in the brake circuits 1, 2, or time elements for the determination of the change-over times of the valve 5 etc.

In the embodiment shown herein, only in one diagonal 1 or 2, braking pressure is introduced into the wheel brake 16 or 17 of the rear wheel HL or HR during each braking action by means of the four-way/two-position directional control valve 5. The embodiment illustrated the drawing shows directional control valve 5 in its inactive position, whereby hydraulic pressure fluid flows from circuit 1 through valve port 22 to rear wheel brake 17 and fluid from circuit 2 is cut off from wheel brake 16. Upon actuation of directional control valve 5 responsive to signals transmitted by electronics 8, the valve moves to the left, as illustrated, whereby pressure fluid from circuit 1 to wheel brake 17 is cut off, and pressure fluid in circuit 2 is connected to wheel brake 16 by means of valve port 23. As pressure fluid is supplied to either one of wheel brakes 16,17, the remaining unbraked rear wheel continues to run unbraked.

The delivery of braking pressure into the wheel brake 16 or 17 of the real wheel will, however, become possible only after the two-way/two-position directional control valve 6, 7 arranged in series has been switched from its inactive position illustrated to assume its opened position. This is because the brake system described herein concerns a device in which the brake force distribution is controlled in dependence upon the brake slip on the front wheels VL, VR such that at the rear wheel HR, HL connected—depending on the switch position of the valve 5—there will always result approximately the same or a somewhat lower value of adherence, as has been depicted in German publication No. P 33 01 948.

Another variant compared to the brake system illustrated or, respectively, to the braking modulator 4 consists in that under certain conditions, e.g. until attainment of a braking pressure limit value, there is first admitted braking pressure rise in the rear-wheel brakes 16,17 of both rear wheels HL, HR, by use of additional valves or an additional switch position of the valve 5, and in that the inventive valve 5 is caused to operate only after further pressure rise, or, respectively, in that further braking pressure rise at the rear axle is limited to one of the two wheels HL or HR. In the second rear-wheel brake, the braking pressure is maintained constant until termination of the braking action in this embodiment (not shown). The electronics 8 may likewise be realized by means of a hard-wired logic or by programmed microcomputers.

What is claimed is:

1. A brake system for automotive vehicles comprising a braking pressure generator and a controllable braking pressure modulator which is arranged in the pressure medium conduits leading to both rear-wheel brakes and which allows variation of the apportioning of the braking pressure to the wheel brakes of the front axle and the rear axle for the purpose of approximation to an ideal brake force distribution, wherein the braking pressure modulator (4) comprises valve assemblies (5) which upon the initiation of braking pressure allow braking pressure alternately to the wheel brake of the right rear wheel (HR) and the left rear wheel (HL) so that one of the two rear wheels furnishes all of the brake force apportioned to the rear axle, which is that portion of brake force that is allotted to the rear axle in the event of approximately ideal brake force distribution.

2. A brake system as claimed in claim 1, wherein the pressure delivery alternates to the wheel brake (16, 17) of the other rear wheel (HL, HR) on each braking operation.

3. A brake system as claimed in claim 1, wherein the pressure delivery alternates to the wheel brake (16, 17) of the other rear wheel (HL, HR) after a predetermined number of braking operations or brake actuations.

4. A brake system as claimed in claim 1, wherein the pressure delivery into the wheel brakes (16,17) of the rear axle alternates to the other rear-wheel brake on termination of a predetermined period of time, while the said change-over is to be performed when the brake is not actuated.

5. A brake system for automotive vehicles comprising a braking pressure generator and a controllable braking pressure modulator which is arranged in the pressure medium conduits leading to both rear-wheel brakes and which allows variation of the apportioning of the braking pressure to the wheel brakes of the front axle and the rear axle for the purpose of approximation to an ideal brake force distribution, wherein the braking pressure modulator (4) contains valve assemblies (5) which upon the initiation of braking pressure allow braking pressure alternately to the wheel brake of the right rear wheel (HR) and the left rear wheel (HL) so that one of the two rear wheels furnishes the predominant share of the brake force apportioned to the rear axle, which is that portion of brake force that is allotted to the rear axle in the event of approximately ideal brake force distribution, wherein until attainment of a predetermined limit value of one of slowing down of the braking pressure and a derived measured variable, both rear-wheel brakes (16,17) are acted upon by the same braking pressure, and wherein, in excess of this limit value, the braking pressure remains constant in one of the two rear-wheel brakes alternately.

6. A brake system as claimed in claim 5, wherein the limit value is varied in dependence upon one of the vehicle deceleration and the axle load.

7. A brake system as claimed in claim 5, wherein the braking pressure modulator (4) is composed substantially of at least one controllable multi-directional control valve (5, 6, 7).

8. A brake system as claimed in claim 7, wherein a four-way/two-position directional control valve is provided as a valve assembly (5) for the alternating pressure delivery into the right and left rear-wheel brake, said valve opening in both of its switch positions the passage of each one pressure medium conduit leading from the braking pressure generator (1) to the wheel brake (16, 17) of one rear wheel (HL or HR), while it closes the pressure medium conduit to the other rear-wheel brake.

9. A brake system as claimed in claim 7, wherein a four-way/two-position directional control valve is provided as a valve assembly (5) for the alternating pressure delivery into the right and the left rear-wheel brake (16, 17), said valve releasing in both of its switch positions one unthrottled and one throttled passage to the two rear-wheel brakes (16, 17), respectively.

10. A brake system as claimed in claim 9, wherein the multi-directional control valves (5, 6, 7) of the braking pressure modulator (4) are electromagnetically actuatable.

* * * * *